Dec. 20, 1960  J. Z. DE LOREAN  2,964,975
TRANSMISSION
Filed Aug. 12, 1957  3 Sheets-Sheet 1
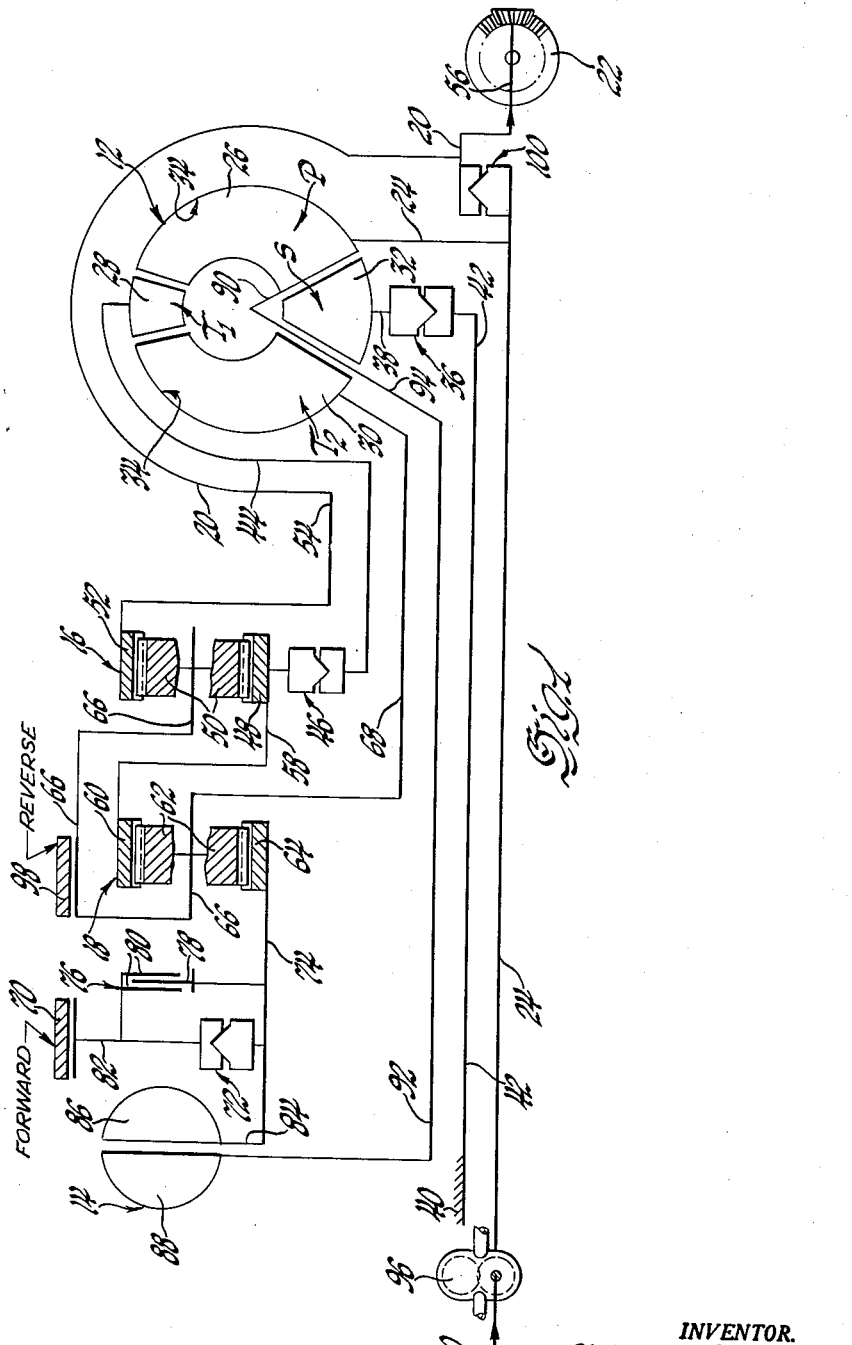
INVENTOR.
John Z. DeLorean
BY
W. C. Middleton
ATTORNEY.

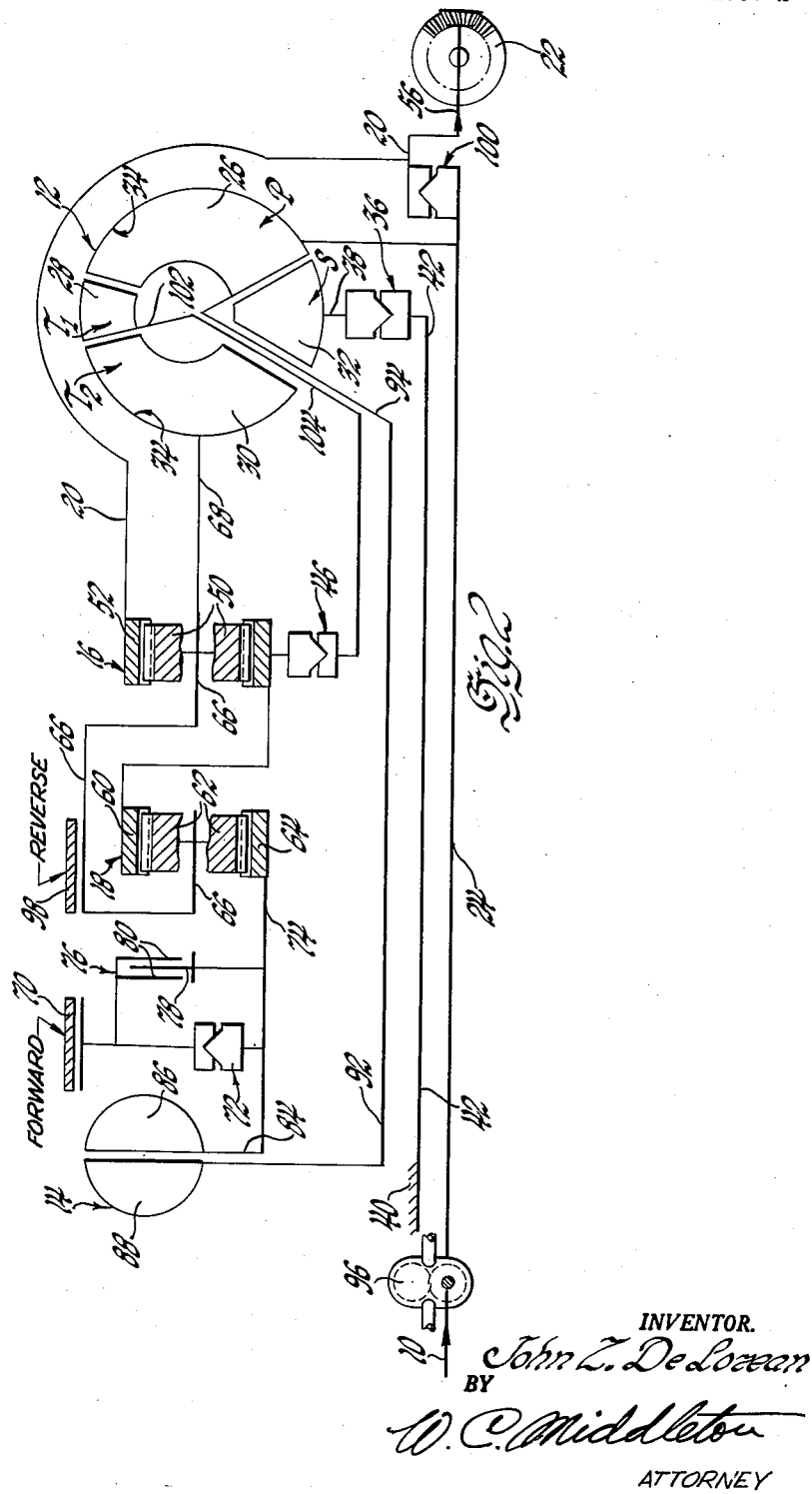

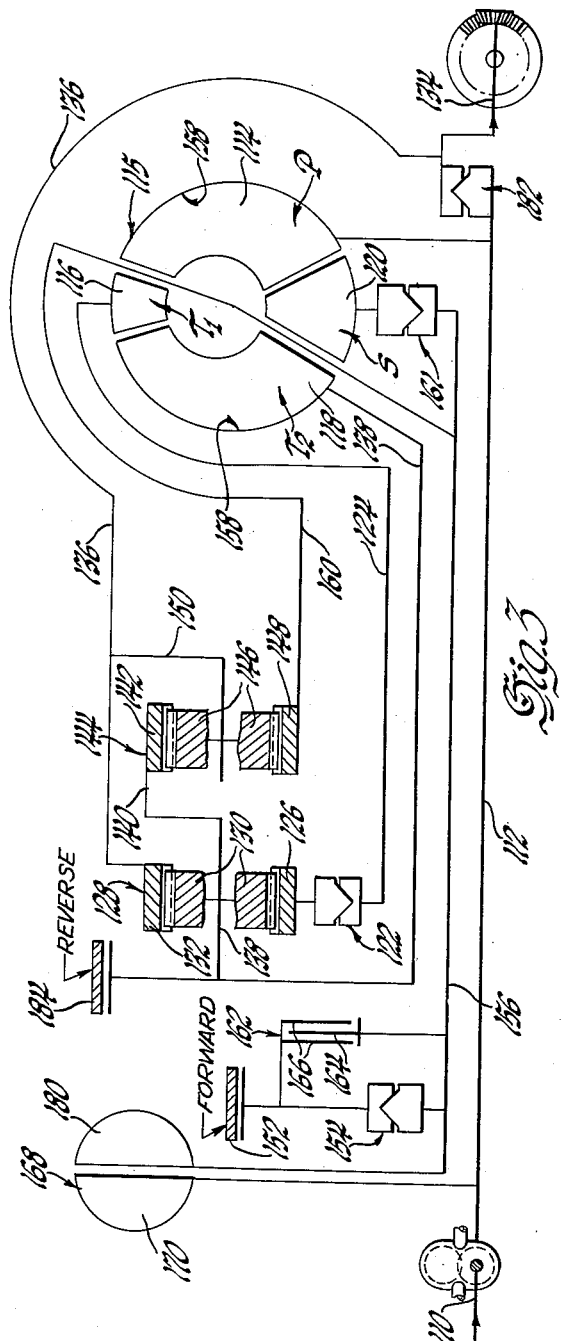

United States Patent Office 2,964,975
Patented Dec. 20, 1960

2,964,975

TRANSMISSION

John Z. De Lorean, Birmingham, Mich., assignor to General Motors Corporation, Detroit, Mich., a corporation of Delaware Filed Aug. 12, 1957, Ser. No. 677,429

20 Claims. (Cl. 74—677)

This invention relates to a rear axle mounted automatic transmission.

In the present day usage of automatic transmissions wherein the transmission is located abutting the rear end of the engine, considerable space is wasted in the passenger seating compartment due to the presence of a "hump." Since the floorboard of the vehicle must be built low to the ground to provide adequate height for the comfort of the passengers, this "hump" must of necessity be present at the point where the floorboard passes over the transmission housing. This invention eliminates this "hump" by providing a transmission that is mounted adjacent the rear axle of the vehicle, thereby providing the maximum amount of space available in the passenger seating compartment.

Therefore, it is an object of this invention to provide a rear axle mounted transmission comprising a torque converter in combination with a plurality of planetary gear sets providing a plurality of forward speed ranges, neutral and reverse.

It is also an object of this invention to provide an automatic transmission having a torque converter and a fluid coupling in combination with a plurality of planetary gear sets to provide a plurality of forward speeds, neutral and reverse.

It is a further object of this invention to provide a rear axle mounted transmission that is high in efficiency and low in cost of manufacture, with compactness in design and ease of repair.

Other features, advantages and objects will become apparent by reference to the detailed description of the invention and to the drawings wherein:

Figure 1 is a diagrammatic illustration of a preferred transmission embodying this invention, Figure 2 is a modification of the transmission of Figure 1, and Figure 3 is a further modification of the transmission of Figure 1.

Referring now to the drawings and more particularly to Figure 1, there is shown therein an input shaft 10 driving a torque converter 12 and a fluid coupling 14, which in turn drive first and second planetary gear sets 16 and 18, respectively, to drive an output shaft 20 adapted to drive the wheels of the vehicle by means of a rear axle 22.

Input shaft 10, which may be driven by any suitable source of power, such as an internal combustion engine (not shown), is adapted to drive by means of shaft 24 the rotatable pump element 26 of torque converter 12 having a first rotatable turbine 28, a second rotatable turbine 30 and a conventional stator or reaction member 32. Pump 26, turbines 28 and 30 and stator 32 together enclose and define a fluid chamber 34 for the circulation of fluid therein, and are provided with blades so designed that fluid leaving forwardly rotating pump 26 will cause turbines 28 and 30 to be normally rotated in a forward direction, with the stator 32 at low pump speeds tending to rotate in a reverse direction, while at higher pump speeds, stator 32 will rotate in the same direction as the pump. Reverse rotation of stator 32 is prevented by means of a one-way brake 36 having one race connected to the stator by means of a connection 38, with the other race being connected to a stationary part of the casing at 40 by means of connection 42. Thus, at low pump speeds, the one-way device 36 will engage to prevent reverse rotation of stator 32, while permitting overrun or overtravel of the stator in a forward direction at higher speeds of the pump.

First turbine 28 is drivingly connected by means of connection 44 and a one-way engaging device 46 to the sun gear 48 of the first planetary gear set 16 having a plurality of pinions 50 meshing therewith and in turn meshing with a rotatable ring or internal gear 52. Connected to ring gear 52 by means of drive connection 54 is the output shaft 20 rotatably surrounding and enclosing torque converter 12 and being attached to the output shaft at 56 to drive the rear axle 22.

One-way engaging device 46 in the connection between turbine 28 and sun gear 48 permits the forward driving of sun gear 48 by turbine 28 at slow speeds of the sun gear while permitting faster forward rotation or freewheeling of the sun gear 48 with respect to the first turbine 28. Connected with sun gear 48 by means of drive connection 58 is the ring gear 60 of the second planetary gear set 18 having a plurality of pinions 62 meshing with said ring gear and a sun gear 64. Rotatably supporting the planet pinions 62 of the second planetary gear set and pinions 50 of the first planetary gear set is a planet carrier 66 having a drive connection 68 connected at one end to the second turbine 30.

Sun gear 64 is adapted to be held stationary in at least one direction of rotation to act as a reaction member for the gear set 18 by means of a friction brake 70 having a connection through a one-way engaging device 72 to a sleeve shaft 74 connected integrally with sun gear 64. The one-way engaging device 72, with brake 70 engaged, acts to permit forward rotation of sun gear 64 with respect to the brake 70, while preventing reverse rotation relative thereto.

A second friction brake means 76 is provided having a clutch face 78 formed as an extension of sleeve shaft 74 and mating with a clutch face 80 formed on the connection 82 between the brake means 70 and the one-way engaging device 72. This second brake means, as will be described hereinafter, is actuated to maintain the sun gear 64 stationary in both directions of rotation to provide a braking effect upon coast of the vehicle.

Formed on an extension 84 of sleeve shaft 74 is the rotatable turbine or rotor element 86 of the fluid coupling 14 cooperating with and to be driven by the rotatable impeller element 88 connected to pump 26 at 90 by means of a sleeve shaft 92 and a connection 94 extending through the torque converter between the second turbine 30 and stator 32.

Fluid coupling 14 is of the "fill and empty" type, wherein, during normal forward low speed operation of the transmission, the fluid coupling will be emptied to render it ineffective, while at higher speeds, fluid will be introduced from an engine driven pump 96 to fluid connect sun gear 64 and the input shaft 10 to rotate the sun gear at approximately engine speed.

A third friction brake means 98 is provided for engagement with the carrier 66 to provide a reverse drive through the transmission by holding the second turbine 30 and the carrier 66 stationary to act as a reaction member.

Operably connecting the input sleeve shaft 24 and output shaft 56 is a one-way engaging device 100 permitting shaft 24 to overrun or overtravel output shaft 56 in a forward direction, yet permitting output shaft 56 to drive input shaft 24, as in the case when the engine is being started by means of a push start. This one-way device 100 also acts to provide an engine braking effect upon coasting of the vehicle in a forward direction wherein the driven shaft 56 attempts to drive the input shaft 24.

OPERATION

Neutral

Upon disengagement of brakes 70, 76, 98 and the emptying of coupling 14, no drive will be transmitted from the input shaft 10 to output shaft 20, since the gear sets idle freely with no reaction members being provided.

Forward

Upon engagement of brake 70 by fluid under pressure through suitable conduits (not shown) from engine driven pump 96, and upon disengagement of brake 76, brake 98, and emptying of fluid coupling 14, rotation of input shaft 24 in a forward direction drives pump 26 forwardly thereby initially rotating first turbine 28 forwardly engaging one-way device 46 to drive sun gear 48 and ring gear 60 forwardly. At this time, due to the load on the output shaft 56 tending to prevent rotation of ring gear 50, and due to the viscous nature of the fluid in the torque converter 12 initially retarding rotation of second turbine 30, carrier 66 will tend to remain stationary upon initial rotation of pump 26 causing forwardly rotating ring gear 60 to attempt to rotate sun gear 64 in a reverse direction, such reverse rotation being prevented by engagement of the one-way device 72 to hold the sun gear 64 stationary. With the sun gear 64 stationary, carrier 66 (and thus turbine 30) of the second planetary gear set 18 will be rotated forwardly at a reduced speed thereby imparting a second forwardly driving force to the first planetary gear set 16 in addition to the forwardly driving sun gear 48 to rotate the ring gear 52 and output shaft 20, 56 in a forward direction and at a speed reduced from that of the input shaft speed. Concurrently with this motion, stator 32 will have been prevented from rotating reversely by the one-way device 36, and torque conversion in the torque converter 12 will exist, as is conventional.

Upon further increase in speed of pump 26, turbine 28 will continue to rotate sun gear 48 and ring gear 60, and second turbine 30 will begin to take over the drive by fluid driving the carrier 66 at an increased speed. When the second turbine 30 reaches a point where it becomes the main driving force and first turbine 28 becomes the follower, the carrier 66 will be the primary driving force to the first and second planetary gear sets. Since ring gear 52 of the first set 16 is connected to the load through the output shaft 56, ring gear 52 will offer reaction to the drive by the carrier, therefore causing the carrier 66 to drive sun gear 48 faster than it is being driven by turbine 28, sun gear 48 overrunning or overtraveling with respect to turbine 28 by disengagement of one-way device 46. Since ring gear 60 of gear set 18 is connected to sun gear 48 by connection 58, ring gear 60 will be driven forwardly faster than it is being driven by carrier 66. Therefore, carrier 66 will also offer reaction and ring gear 60 will attempt to drive sun gear 64 backwardly, which is prevented by one-way device 72. Sun gear 64 therefore remains the reaction member, and the ring gear 60 will drive carrier 66 and therefore ring gear 52 to provide a compound differential drive to the output shaft 56 in a forward direction and at an intermediate speed ratio.

Upon sufficient increase in speed of second turbine 30 to a point where it approaches the speed of pump 26 and the torque converter approaches the fluid coupling stage with all elements rotating forwardly, the introduction of fluid into the fluid coupling 14 by any suitable means (not shown) is made to couple the drive shaft 24 and sun gear 64 by means of sleeve shafts 92 and 74 to rotate sun gear 64 forwardly, such rotation being permitted by release of one-way device 72. At this time, sun gear 64 and carrier 66 will be driven forwardly at approximately the same speed, the speed differential being due to the inherent slip in the torque converter and coupling, to substantially "lock-up" the second planetary gear set 18 and also the first planetary gear set 16 to drive the output shaft 56 at approximately the speed of input shaft 24. This speed ratio corresponds to high speed drive through the transmission.

Reverse

Upon application of brake band 98 with release of brake 70 and the emptying of fluid coupling 14, turbine 30 and carrier 66 will be held stationary to act as a reaction member for the first planetary gear unit 16. Therefore, forward rotation of pump 26 will cause turbine 28 to rotate sun gear 48 forwardly by engagement of one-way device 46 to rotate the ring gear 52 in reverse thereby driving output shaft 20 and 56 reversely from the direction of rotation of the input shaft 24 and at a reduced speed thereto. At this time, the second planetary gear set 18 merely idles, there being no means to prevent reverse rotation of sun gear 64.

Coast braking

At some point in the rotation of the second turbine 30, ring gear 60 and carrier 66 will be rotating at such a speed that sun gear 64 will be caused to reverse its initial reverse direction of rotation and will rotate in a forward direction. At this time, upon the operator releasing the driving torque from the engine by release of the accelerator pedal (not shown), the vehicle will tend to coast forwardly with the driven shaft 56 attempting to drive input shaft 24 back through the gear set. However, since the sun gear 64 is rotating freely forwardly, no braking effect would be had except for the one-way device 100. Under these conditions of coast, upon application of the coast brake 76, a reduction drive would be established by the holding of sun gear 64 stationary in both directions of rotation to provide a geared braking effect on the output shaft. If further braking is desired, the operator may begin filling of the coupling 14. Since the turbine 86 is held stationary by the coast brake 76, a churn brake effect will be established because of the connection 92 between the two pump elements 26 and 88, the pump 88 being retarded in its rotation through the medium of the fluid entering the coupling.

Referring now to Figure 2, there is shown therein a slight modification of the transmission of Figure 1, the change being in the torque converter 12; the gear sets, fluid coupling and connections being identical with that of the embodiment of Figure 1. In this Figure 2 modification, instead of the connection from the first turbine 28 to the one-way device 46 being by a connection 44 surrounding the second turbine 30 and being enclosed by rotatable shaft 20, turbine 28 is connected through the torque converter chamber 34 by connections 102 and 104 to the one-way device 46. The operation of this embodiment is identical to that of the embodiment of Figure 1, the only change being in the particular connections noted.

Referring now to Figure 3, there is shown therein a transmission slightly modified from that of the embodiment of Figure 1. In this modification, input shaft 110 drives by means of a connection 112, the pump 114 of a hydraulic torque converter 115 having a first turbine 116, second turbine 118 and stator 120. Connected to the first turbine by one-way device 122 and drive connection 124 to be driven thereby is a sun gear 126 of a first planetary gear unit 128 having a plurality of rotatable pinions 130 meshing with said sun gear 126 and a ring gear 132 connected to the output shaft 134 by means of a drive connection 136 rotatably surrounding and enclosing the torque converter 115. Rotatably supporting pinions 130 is a carrier member 138 having an extension 140 at one end connected to the ring gear 142 of a second planetary gear set 144 having a plurality of pinions 146 meshing with said ring gear and a rotatable sun gear 148. Rotatably supporting pinions 146 of this second gear set is a carrier 150 connected with the output shaft connection 136 to output shaft 134 and the ring gear 132 of the first planetary gear set. A friction brake means 152 is provided for holding sun gear 148 stationary in at least one direction of rotation and is connected thereto through a one-way engaging device 154 connected to a sleeve shaft 156 extending to the sun gear drive connection 160 through the torque converter fluid chamber 158 between the second turbine 118 and stator 120 and the first turbine 116 and pump 114 to surround the first and second turbines while being enclosed by output shaft portion 136. One-way device 154 permits rotation of shaft 156 and sun gear 148 in a forward direction, i.e., in the same direction as pump 114, while preventing reverse rotation relative thereto. Stator 120 is adapted to be connected to sleeve shaft 156 by means of a one-way device 161, this device preventing reverse rotation of the stator with respect to the sleeve shaft, while permitting freewheeling in a forward direction of rotation of the stator relative thereto. A coast brake 162 is provided in the same manner as shown in Figure 1 having friction plates 164 connected to sleeve shaft 156 mating with friction faces 166 attached to brake means 152. Likewise, a "dump and fill" or "fill and emtpy" fluid coupling 168 is provided having its impeller member 170 formed on an extension of input shaft 110 with its turbine or rotor 180 formed on an extension of sleeve shaft 156.

Furthermore, a one-way device 182 connects the input shaft 110 and output shaft 134 in at least one direction of rotation to permit overrun of input shaft 110 with respect to output shaft 134, while permitting output shaft 134 to attempt to drive input shaft 110 to effect engine braking or to start a stalled engine by means of a push start.

A second brake means 184 is provided for holding the carrier 138 of the first planetary gear set and the ring gear 140 of the second gear set stationary to act as a reaction member to provide a reverse drive through the transmission.

OPERATION

*Neutral*

Upon disengagement of brakes 152, 162, 184 and the emptying of fluid coupling 168, the members of the gear set normally acting as reaction members will idle freely thus preventing a drive to the output shaft 136.

*Forward*

Upon engagement of brake 152 with disengagement of brakes 184, brake 162 and the emptying of fluid coupling 168, forward rotation of input shaft 110 will drive pump 114 forwardly thereby rotating the first turbine 116 forwardly to drive sun gear 126 in a forward direction. Since the load on the output shaft 134 tends to hold the ring gear 132 of the first gear set stationary, carrier 138 will be rotated forwardly thereby rotating ring gear 142 of the second planetary gear set forwardly. Since carrier 150 of this second unit is also held stationary temporarily by fluid flow action in the torque converter on turbine 118 thereby causing the carrier to act as a reaction member, sun gear 148 will attempt to rotate reversely, such reverse rotation being prevented by the engagement of one-way device 154. Thus, carrier 150 will be rotated forwardly thereby rotating ring gear 132 forwardly and through its connection 136 will rotate the output shaft 134 forwardly and at a speed reduced from that of the speed of input shaft 110. Upon increased rotation of pump 114 and turbine 116, turbine 118 will be rotated forwardly to rotate carrier 138 and ring gear 142 forwardly at a faster speed thereby rotating carrier 150 and ring gear 132 forwardly to drive output shaft 134 at an intermediate forward speed ratio. Upon a further increase in rotation of pump 114 and turbine 116, turbine 118 will become the primary driving force to the first and second planetary gear sets, causing sun gear 126 to overrun or overtravel the turbine 116, which is permitted by the unlocking of one-way device 122. Overrunning of the sun gear 126 will cause the first gear set 128 to idle and all of the drive to the output shaft 134 will be made by the second turbine 118 and carrier 140 through the second gear set 144. Thus an intermediate speed ratio will be established.

At the point where the second turbine 118 is rotating at approximately the speed of pump 114, fluid may be introduced into fluid coupling 168 to fill the same and couple the input shaft 110 and sun gear 148 for rotation at approximately the same speed. Thus, sun gear 148 and ring gear 140 will be rotating at approximately the same speed thereby substantially "locking up" the second gear set 144 and therefore the first planetary gear set 128 to drive the output shaft 134 at approximately the speed of input shaft 110, the speed differential being due to the inherent slip in the torque converter 115 and fluid coupling 168.

*Coast braking*

Application of coast brake 162 in addition to the engagement of brake 152, with the release or emptying of coupling 168, will cause sun gear 148 to be held stationary at all times to retard freewheeling or overtravel of the output shaft with respect to the input shaft 110. This coast brake 162 thus provides a retarding effect on the output shaft 134 through the gearing. Further braking is provided by additionally filling the coupling 14, thereby providing a churn brake effect as previously described in connection with the Figure 1 embodiment.

*Reverse*

Application of brake 184 with release of brakes 152 and 162 and emptying of coupling 168, holds carrier 138 stationary to act as a reaction member for the first planetary gear set 128, thereby causing turbine 116 to rotate sun gear 126 forwardly through one-way device 122, thereby rotating ring gear 132 rearwardly to drive output shaft 134 in reverse to provide a reverse reduction drive through the transmission.

From the foregoing it will be seen that this invention provides a rear axle mounted transmission that is economical to manufacture, is highly efficient in use and compact in design. It will also be seen that the invention provides a transmission having a torque converter and fluid coupling in combination with a plurality of planetary gear sets to provide a plurality of forward speed ratios, neutral and reverse. It will further be seen that the invention provides a transmission having a torque converter and output shaft at one end with planetary gearing adjacent the input shaft at the other end, the output shaft being connected to the gearing through a novel arrangement of the output shaft surrounding and enclosing the torque converter unit. The invention further provides a transmission equipped with a single fluid pump driven by the input shaft with the transmission having a one-way device connecting the input and output shafts rendering a driven shaft pump unnecessary for push starts, etc. The invention still further provides a dual fluid driving unit for driving the gearing of a transmission. It will be understood that the invention can be modified beyond the illustrated embodiments, and therefore, any limitations to be imposed are those set forth in the following claims.

I claim:

1. A transmission comprising an input shaft, an output shaft, and means connecting said shafts, said means including a hydrodynamic drive device and gear means, said drive device including a rotatable pump connected to said input shaft and a plurality of rotatable turbines, said gear means including a plurality of planetary gear sets each having a plurality of relative rotatable members, a housing for said drive device, said housing being connected at one end to said output shaft and connected at its other end to one of the rotatable members of one of said gear sets, means connecting one of the rotatable members of one of the gear sets with a rotatable member of another of the gear sets, means drivingly connecting one of the turbines to one of the gear sets, means drivingly connecting another of the turbines to a plurality of gear sets, brake means for preventing rotation of one of said members of one of said gear sets in at least one direction for causing said member to act as a reaction member to provide a forward reduction drive in said gear set upon rotation of the turbines, and a second hydrodynamic drive device connecting said pump and said reaction member, said second device being capable of being filled and emptied of fluid, the filling of said device upon rotation of said pump causing said output shaft to be rotated at a speed approximately equal to the speed of said input shaft.

2. An automatic transmission comprising an input shaft, an output shaft, and means connecting said shafts, said means including a hydrodynamic drive device and planetary gear means, said drive device including a rotatable pump connected to said input shaft and a plurality of rotatable turbines, said gear means including a plurality of rotatable members, means drivingly connecting one of said turbines with one of said rotatable members, means drivingly connecting another of said turbines with another of said rotatable members, a housing for said drive device rotatably surrounding said device, said housing having one end connected at all times to said output shaft with its other end connected at all times to another of said rotatable members, brake means for preventing rotation of one of said rotatable members in at least one direction to provide a reaction member in said gear set and a forward reduction drive through said gear set upon forward rotation of said turbines, and a second hydrodynamic drive device connecting said pump and said reaction member for substantially locking up said gear set for driving said housing at a speed approximately equal to the speed of said input shaft.

3. A transmission as in claim 2, wherein said brake means includes a one-way engaging device releasable upon rotation of said reaction member in the same direction as said pump, said second drive device capable of being filled and emptied of fluid, filling of said second drive device upon rotation of said pump causing release of said one-way device to rotate said output shaft at a speed approximately equal to the speed of said input shaft.

4. A transmission including an input shaft, a driven shaft and means connecting said shafts, said means including a plurality of hydrodynamic drive devices and planetary gear means, one of said drive devices including a rotatable pump connected to said input shaft and a plurality of rotatable turbines, another of said drive devices including a rotatable impeller and a rotatable rotor, said gear set including a plurality of rotatable members, one of said turbines being drivingly connected with one of said rotatable members, another of said rotatable turbines being drivingly connected with a plurality of other rotatable members, a housing rotatably surrounding said first drive device, said housing having one end connected at all times to said output shaft with its other end connected at all times to another of said rotatable members, means connecting said rotor and another of said rotatable members, means connecting said impeller and said pump, said second drive device capable of being filled and emptied of fluid, rotation of said pump upon filling of said second device causing said first device to rotate said output shaft through said gear set at a speed approximately equal to the speed of said input shaft.

5. A transmission comprising an input shaft, an output shaft, and means connecting said shafts, said means including a plurality of hydrodynamic drive devices and gear means, one of said devices including a rotatable pump and a plurality of rotatable turbines, another of said drive devices including a rotatable impeller and rotor, means connecting said impeller and pump to said input shaft, means drivingly connecting said plurality of rotatable turbines and said rotor to said gear means, a rotatable housing surrounding said first drive device, said housing having one end connected at all times to said output shaft and another end connected at all times to said gear means to be driven thereby, said other drive device capable of being filled and emptied of fluid, rotation of said input shaft with the filling of said other drive device rotating said housing at a speed approximately equal to the speed of said input shaft.

6. A transmission having an input shaft, an output shaft, and means connecting said shafts, said means including a plurality of hydrodynamic drive devices and gear means, each of said drive devices having rotatable pump and turbine members, said pump members being connected together and to said input shaft, said turbine members being drivingly connected at all times to said gear means, a housing rotatably surrounding one of said drive devices, said housing having one end connected at all times to said output shaft and another end connected to said gear means to be driven thereby, rotation of said pump members driving said turbine members to drive said output shaft through said gear means at a speed approximately equal to the speed of said input shaft.

7. A transmission having an input shaft, an output shaft, and means connecting said shafts, said means including a hydrodynamic drive device and a plurality of planetary gear sets, said drive device comprising a rotatable pump connected to said input shaft and a plurality of rotatable turbines, said plurality of gear sets each comprising drive, driven and reaction members, a rotatable housing surrounding said drive device, said housing having one end connected to said output shaft and another end connected to be driven thereby to the driven member of one of said gear sets, means connecting one of said turbines to the drive members of each of said gear sets, means connecting another of the turbines to a member of each of said gear sets, and releasable brake means for controlling the rotation of the reaction member of one of said gear sets, application of said brake means upon forward rotation of said pump providing a reduction drive in said gear sets to rotate said output shaft in the same direction as and at a speed reduced from the speed of said pump.

8. A transmission as in claim 7, wherein there is provided fluid clutch means connecting said reaction member and said pump, activation of said clutch means and release of said brake means upon rotation of said pump in a forward direction causing said output shaft to be rotated in the same direction as and at a speed approximately equal to the speed of said pump.

9. A transmission as in claim 7, wherein said means connecting said one turbine and said members comprises a one-way engaging device engageable upon faster rotation of said turbine relative to said members in one direction of rotation of said turbine and releasable upon faster rotation in the same direction of said members relative to said turbine.

10. A transmission as in claim 7, wherein said means connecting said one turbine and said members rotatably encloses said second turbine member.

11. A transmission as in claim 7, wherein said pump and turbines define a fluid chamber therein, said means connecting said one turbine and said members extending through said chamber from said one turbine to said members.

12. A transmission as in claim 4, wherein said pump and turbines define a fluid chamber therein, said means connecting said other rotatable member and said rotor extending through said chamber.

13. A transmission having an input shaft, an output shaft, and means connecting said shafts, said means including a hydrodynamic drive device and planetary gear means, said drive device including a rotatable pump connected to said input shaft and a plurality of rotatable turbines, said planetary gear means including first and second planetary gear sets, each of said gear sets having a rotatable sun gear, a rotatable ring gear and a rotatable carrier supporting a plurality of pinions meshing with said sun and ring gears, means connecting one of said turbines with the sun gear of one of said gear sets, means connecting another of the turbines to the carrier of the first gear set and the ring gear of the second gear set, a rotatable housing enclosing said device, said housing having one end connected to said output shaft with the other end connected to be driven thereby to the carrier of the second gear set and the ring gear of said first gear set, brake means, and means connecting said brake means and the ring gear of said second gear set, application of said brake means upon rotation of said pump in a forward direction causing rotation of said first set ring gear to rotate said output shaft in the same direction as and at a speed reduced from the speed of the pump.

14. A transmission as in claim 13, wherein said pump and turbines together define a fluid chamber therein, said means connecting said brake means and said second unit sun gear extending through said chamber.

15. A transmission as in claim 13, wherein said means connecting said second unit sun gear and said brake means includes a one-way engaging device, said one-way device engaging to prevent reverse rotation of said second unit sun gear with respect to the direction of rotation of said pump while releasing to permit overrun of said sun gear in a forward direction, engagement of said one-way device upon rotation of said pump in a forward direction causing said output shaft to be driven in a forward direction at one speed ratio by forward rotation of both of said turbines, release of said one-way device rotating said output shaft in a forward direction at a different speed ratio.

16. A transmission as in claim 13, wherein there is provided clutch means connecting said input shaft and said second unit sun gear, application of said clutch means upon forward rotation of said pump and plurality of turbines causing said output shaft to be driven in the same direction as and at a speed approximately equal to the speed of rotation of said input shaft.

17. A transmission as in claim 16, wherein said clutch means comprises a second hydrodynamic drive device capable of being filled and emptied of fluid, the filling of said second device causing the speed of said output shaft to be approximately equaled to the speed of said input shaft.

18. A transmission having an input shaft, an output shaft, and means connecting said shafts, said means including a plurality of hydrodynamic drive devices and gear means, each of said drive devices having rotatable pump and turbine members, and means at times holding one of said turbine members of one of said devices stationary in both directions of rotation for retarding any drive of said gear means by said output shaft, said pump members being connected together and to said input shaft, said turbine members being drivingly connected to said gear means, a housing rotatably surrounding one of said drive devices, said housing having one end connected at all times to said output shaft and another end connected at all times to said gear means to be driven thereby, rotation of said pump members driving said turbine members to drive said output shaft through said gear means at a speed approximately equal to the speed of said input shaft.

19. A transmission comprising an input shaft, an output shaft, and means connecting said shafts, said means including a plurality of hydrodynamic drive devices and gear means, one of said devices including a rotatable pump and a plurality of rotatable turbines, another of said drive devices including a rotatable impeller and rotor, means connecting said impeller and pump to said input shaft, means drivingly connecting said plurality of rotatable turbines and said rotor to said gear means, a rotatable housing surrounding said one drive device, said housing having one end connected at all times to said output shaft and another end connected at all times to said gear means to be driven thereby, said other drive device capable of being filled and emptied of fluid, rotation of said input shaft with the filling of said other drive device rotating said housing at a speed approximately equal to the speed of said input shaft, and means at times holding said rotor stationary for retarding the driving of said gear means by said output shaft upon filling of said device.

20. A transmission including an input shaft, an output shaft and means connecting said shafts, said means including a plurality of hydrodynamic drive devices and planetary gear means, one of said drive devices including a rotatable pump connected to said input shaft and a plurality of rotatable turbines, another of said drive devices including a rotatable impeller and a rotatable rotor, said gear set including a plurality of rotatable members, one of said turbines being drivingly connected with one of said rotatable members, another of said rotatable turbines being drivingly connected with a plurality of other rotatable members, a housing rotatably surrounding said one drive device, said housing having one end connected at all times to said output shaft with its other end connected at all times to another of said rotatable members, means connecting said rotor and another of said rotatable members, means connecting said impeller and said pump, said other drive device capable of being filled and emptied of fluid, rotation of said pump upon filling of said other device causing said one device to rotate said output shaft through said gear set at a speed approximately equal to the speed of said input shaft, and means at times holding said rotor stationary for retarding the driving of said gear means by said output shaft upon filling of said other device.

References Cited in the file of this patent

UNITED STATES PATENTS

| | | |
|---|---|---|
| 2,400,540 | Chilton | May 21, 1946 |
| 2,519,022 | Burtnett | Aug. 15, 1950 |
| 2,687,195 | Gleasman | Aug. 24, 1954 |
| 2,687,657 | Kugel et al. | Aug. 31, 1954 |
| 2,695,533 | Pollard | Nov. 30, 1954 |
| 2,803,974 | Kelley | Aug. 27, 1957 |
| 2,861,474 | Moore | Nov. 25, 1958 |

UNITED STATES PATENT OFFICE
CERTIFICATE OF CORRECTION

December 20, 1960

Patent No. 2,964,975

John Z. De Lorean

It is hereby certified that error appears in the above numbered patent requiring correction and that the said Letters Patent should read as corrected below.

Column 7, line 56, for "a driven" read --- an output ---; column 8, line 27, after "connected" strike out "at all times" and insert the same before "to", first occurrence, in line 31, same column.

Signed and sealed this 12th day of September 1961.

(SEAL)
Attest:

ERNEST W. SWIDER

Attesting Officer

DAVID L. LADD

Commissioner of Patents

USCOMM-DC